M. WALTER.
DIFFERENTIAL GEARING FOR MOTOR VEHICLES.
APPLICATION FILED MAR. 30, 1915.

1,164,770.

Patented Dec. 21, 1915.

Witnesses:

INVENTOR
Maurice Walter
BY
Redding, Greely & Goodlett
ATTORNEYS

UNITED STATES PATENT OFFICE.

MAURICE WALTER, OF NEW YORK, N. Y.

DIFFERENTIAL GEARING FOR MOTOR-VEHICLES.

1,164,770.  Specification of Letters Patent.  Patented Dec. 21, 1915.

Application filed March 30, 1915. Serial No. 17,963.

*To all whom it may concern:*

Be it known that I, MAURICE WALTER, a citizen of the United States, residing in the borough of Manhattan of the city of New York, in the State of New York, have invented certain new and useful Improvements in Differential Gearing for Motor-Vehicles, of which the following is a specification, reference being had to the accompanying drawings, forming a part hereof.

This invention relates to differential gearing for motor vehicles by which the power is transmitted from the engine to the driving wheels and compensation is effected for differential rotation of the driving wheels, as when the vehicle deviates from a straight course. The particular type of differential gearing with which the invention is especially concerned is popularly termed in the art "worm" differential in which are included worms and coöperating worm or spiral gears. The general advantages peculiar to this type of differential gearing are fully appreciated in the art, and briefly stated, reside in a positive drive of both drive wheels, independent of the traction conditions, thereby eliminating the acceleration of a drive wheel with decreased traction as is common with the conventional balance gear differential and the consequent loss of power, irregular running, skidding and wear of tires, but still allowing a correct compensating differential action when the vehicle deviates from a straight course.

The present invention has for its principal object to provide a differential which shall embody all of the advantages peculiar to a worm differential and which shall, in addition, be simple in construction, compact, strong and durable.

In accordance with the invention, the number of parts hitherto employed in a worm differential has been materially lessened and a construction provided whereby the required driving and differential forces are transmitted from one worm to the correlated worm, through two simple gear elements, the power being derived, as usual, from a master gear. In the improved construction, the master gear serves to rotate a housing in which are disposed one or more pairs of spiral gears (or their equivalents) which are enmeshed with each other respectively, and separately with driven worms fixed on the two driven shafts, respectively.

A detailed description of the preferred embodiment of the invention will be given with reference to the accompanying drawings, in which—

Figure 1:
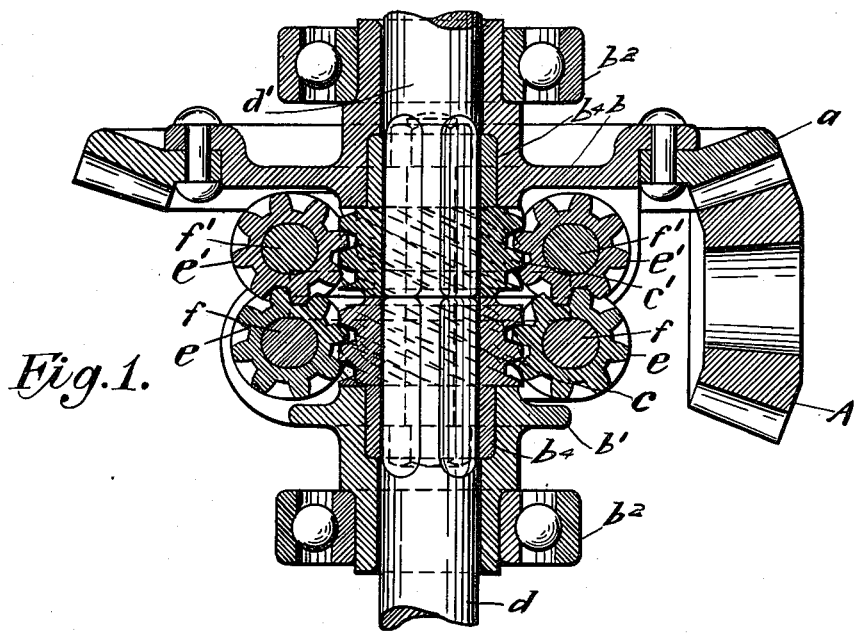
Figure 2:
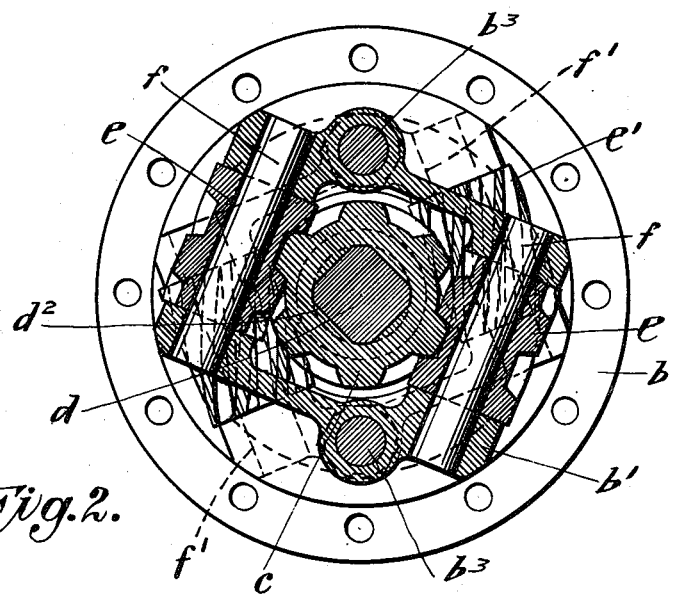

Figure 1 is a view in longitudinal section through a differential constructed in accordance with the present invention and showing fragments of the two driven shafts. Fig. 2 is a view in transverse section through the differential in Fig. 1, showing clearly the inclination of two pairs of enmeshed spiral gears.

Referring now to Fig. 1, it may be supposed that the driving power is transmitted from a driving bevel pinion A to a master bevel gear $a$ in mesh therewith, and secured to a housing for the improved differential gearing which may be formed of two sections $b$, $b'$, journaled in suitable bearings $b^2$. The two sections of the housing may be secured detachably together by means of suitable bolts $b^3$ extending therethrough and shown clearly in Fig. 2. In the housing thus formed are mounted two worms $c$, $c'$, adapted to bear in the housing, as at $b^4$, and receive, respectively, the inner ends of the driven shafts $d$, $d'$, on the outer ends of which it may be supposed, wheels of the vehicle are carried. These sections $d$, $d'$, are, of course, in driving engagement with the respective worms, this engagement being effected conveniently by squaring the ends of the shafts, as at $d^2$, in a manner well known.

As noted before, the advantages of the improved construction can be realized by the employment of one or more pairs of spiral or worm gears disposed with respect to the driven worms $c$, $c'$, in the manner to be described, but for the purposes of this specification, it has been thought sufficient to illustrate only two pairs of such transmission units. A description of one such pair of elements will apply to all other pairs, so the description may be given and the operation described, in the singular.

In the differential housing is mounted a spiral or worm gear $e$, as on a suitable shaft or pin $f$, the axis of which is angularly displaced with respect to the axis of the driven shaft $d$, and the teeth of which gear mesh operatively with the worm $c$. Alongside the spiral gear $e$ and in the walls of the differential housing is mounted a second shaft or pin $f'$ on which is fixedly carried another spiral gear $e'$, the teeth of which are of the same pitch and extend in the same general direction, as the teeth of the other spiral gear *e*. In the interest of compactness, the pins *f* and *f'* will be mounted as close to the driven shafts *d, d'*, as is practicable, depending upon the required diameters of the gears and worms, although it will be evident that to bring about an operative intermeshing of the teeth of these spiral gears *e* and *e'*, the supporting pins *f* and *f'* cannot be disposed in parallel planes, but one must be in an advanced position with respect to the other, at an angle of twice the spiral angle, as regards their angular disposition with respect to the driven shafts *d, d'*. This inclination of one pin *f* with respect to the other pin *f'* is clearly indicated in Fig. 2. The second named spiral gear *e'* has its teeth in mesh with the worm *c'* on the driven shaft *d'* so that between the worm *c* and the worm *c'* there are interposed only the two gear elements *e, e'*. Of course, the number of pairs of such gear elements can be multiplied as conditions of use require, although such additional gear elements will in no wise change the operation of the device.

In operation it may be assumed that the vehicle is traveling in a straight line and the two driven wheels are rotating at equal speeds. Under these conditions, the master gear *a* will rotate the differential housing and carry the shafts *f* and *f'* of the gears *e* and *e'*, bodily, around the driven shafts *d* and *d'*. It will be evident that during this turning movement, the spiral gear *e'* tends to rotate about its supporting pin *f'* by reason of the engagement of the gear with the worm *c'*, and that the spiral gear *e* tends to rotate about its supporting pin *f* in the opposite direction by reason of its engagement with the worm *c*. The opposed rotative efforts thus created although unequal due to the variation of the traction of the driven wheels result in a positive locking of the worms *c, c'*, with respect to each other and with respect to the spiral gears *e, e'*, and the two shafts *d, d'*, are accordingly rotated as a single unit and the speed of the driven wheels remains equal and constant. Assuming now that the vehicle deviates from a straight course, then it becomes imperative that there be a differential movement between the shafts *d* and *d'*. This differential movement will be permitted by reason of the relative movement of the worms *c, c'* with the gears *e, e'* and by reason of the direct meshing of the gears *e, e'*, and their speed ratio of one to one. The compensation for the differential movement between the two driven shafts *d, d'*, is effected in the present construction without the loss of power as regards either of the wheels inasmuch as the driving force is transmitted positively at all times to each of the shafts *d, d'*.

In the illustrated embodiment, one practical construction has been shown and this embodiment possesses all of the advantages to be derived from the present improvements, such as simplicity, accessibility, strength and durability, aside from those common advantages pointed out as pertaining to worm differentials generally.

I claim as my invention:

1. In a differential gearing, a rotatable housing, two driven worms mounted therein, and driving connections between the housing and the worms, said connections including two spiral gears supported in the housing and in mesh with each other and severally with the respective worms, the axes of said gears being one in advance of the other about the axis of the driven worms.

2. In a differential gearing, a rotatable housing, two driven worms mounted therein, and driving connections between the housing and the worms, said connections including two pairs of spiral gears and shafts for the respective gears supported in the housing, said shafts being mounted one in advance of the other about the axis of the driven worms, and the spiral gears of each pair being in mesh with each other and severally with the respective worms.

3. In a differential gearing, a rotatable housing, two driven shafts, a worm carried on the end of each shaft and disposed within the housing, and driving connections between the housing and the worms, said connections including two pairs of spiral gears and shafts for the respective gears supported in the housing in opposed positions with respect to the axes of the driven shafts, the shafts in each pair being mounted one in advance of the other about said axes, and the gears of each pair being in mesh with each other and severally with the respective worms.

4. In a differential gearing, a rotatable housing, two driven shafts, a worm carried on the end of each shaft disposed within the housing, and driving connections between the housing and the worms, said connections including two pairs of spiral gears and shafts for the respective gears supported in the housing in opposed positions with respect to the axes of the driven shafts, the shafts in each pair being mounted one in advance of the other about said axes at an angle of twice the spiral angle, and the gears of each pair being in mesh with each other and severally with the respective worms.

This specification signed and witnessed this 26th day of March, A. D. 1915.

MAURICE WALTER.

Signed in the presence of—
 ELLA J. KRUGER,
 IDA G. GILMORE.